(12) United States Patent
Oike et al.

(10) Patent No.: US 7,372,667 B2
(45) Date of Patent: May 13, 2008

(54) THIN-FILM MAGNETIC HEAD, HEAD GIMBAL ASSEMBLY WITH THIN-FILM MAGNETIC HEAD, HEAD ARM ASSEMBLY WITH HEAD GIMBAL ASSEMBLY, MAGNETIC DISK DRIVE APPARATUS WITH HEAD GIMBAL ASSEMBLY AND MANUFACTURING METHOD OF THIN-FILM MAGNETIC HEAD

(75) Inventors: Taro Oike, Tokyo (JP); Hiraku Hirabayashi, Tokyo (JP); Shin Narushima, Tokyo (JP); Takamitsu Sakamoto, Tokyo (JP); Kiyoshi Noguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 331 days.

(21) Appl. No.: 11/139,697

(22) Filed: May 31, 2005

(65) Prior Publication Data

US 2005/0264934 A1   Dec. 1, 2005

(30) Foreign Application Priority Data

Jun. 1, 2004   (JP)   ............................. 2004-163121

(51) Int. Cl.
*G11B 5/31*   (2006.01)
(52) U.S. Cl. ........................................... 360/126
(58) Field of Classification Search ............... 360/126, 360/122, 119, 317
See application file for complete search history.

(56) References Cited

U.S. PATENT DOCUMENTS

| | | | | |
|---|---|---|---|---|
| 5,801,910 A | * | 9/1998 | Mallary ....................... 360/126 |
| 6,122,144 A | * | 9/2000 | Chang et al. ................ 360/122 |
| 6,125,018 A | * | 9/2000 | Takagishi et al. ........... 360/317 |
| 7,050,267 B2 | * | 5/2006 | Koh et al. ................. 360/234.6 |
| 2004/0190197 A1 | * | 9/2004 | Watabe et al. ............... 360/126 |
| 2004/0240110 A1 | * | 12/2004 | Matono ....................... 360/126 |
| 2005/0174686 A1 | * | 8/2005 | Takano ........................ 360/126 |
| 2005/0264934 A1 | | 12/2005 | Oike et al. | |
| 2006/0002021 A1 | * | 1/2006 | Li et al. ...................... 360/126 |

FOREIGN PATENT DOCUMENTS

JP   6-36234   2/1994

(Continued)

OTHER PUBLICATIONS

U.S. Appl. No. 11/738,686, filed Apr. 23, 2007, Hirabayashi et al.

*Primary Examiner*—Angel Castro
(74) *Attorney, Agent, or Firm*—Oblon, Spivak, McClelland, Maier & Neustadt, P.C.

(57) ABSTRACT

A thin-film magnetic head comprising an inductive element including at least: a lower magnetic pole; a write gap layer; and an upper magnetic pole opposed to the lower magnetic pole through the write gap layer, a width $W_{P2}$ in a track-width direction at a facing-to-magnetic-medium top end of the upper magnetic pole being larger than a width $W_{P1}$ in the track-width direction at a facing-to-magnetic-medium top end of the lower magnetic pole, and a distance $FPD_{P2}$ between the top end of the upper magnetic pole and a flare point of the upper magnetic pole being smaller than a distance $FPD_{P1}$ between the top end of the lower magnetic pole and a flare point of the lower magnetic pole, is provided.

13 Claims, 9 Drawing Sheets

FOREIGN PATENT DOCUMENTS

| | | |
|---|---|---|
| JP | 6-314413 | 11/1994 |
| JP | 9-96909 | 4/1997 |
| JP | 11-3510 | 1/1999 |
| JP | 2001-273608 | 10/2001 |
| JP | 2003-36506 | 2/2003 |

* cited by examiner

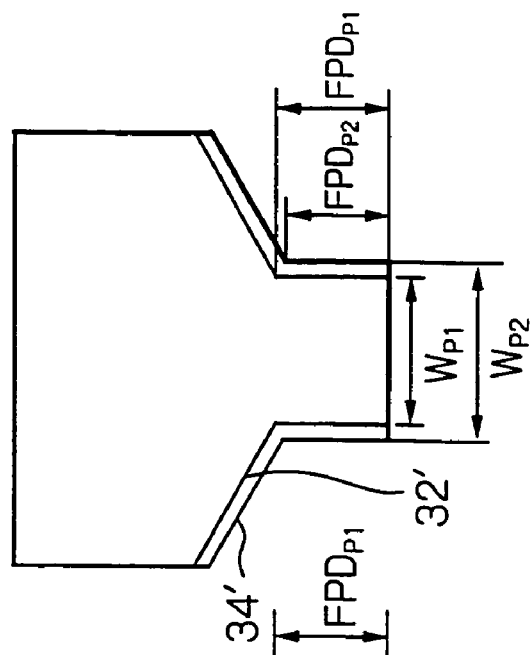
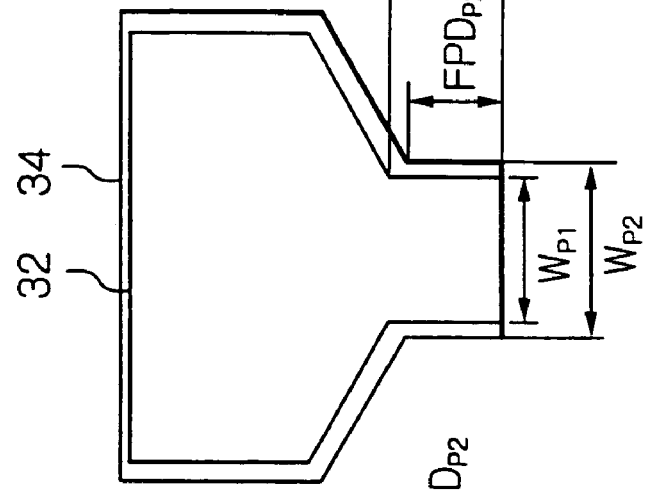
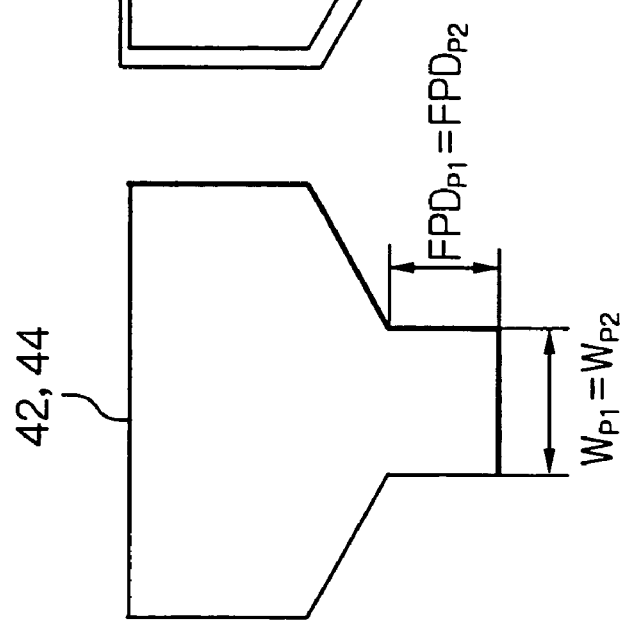

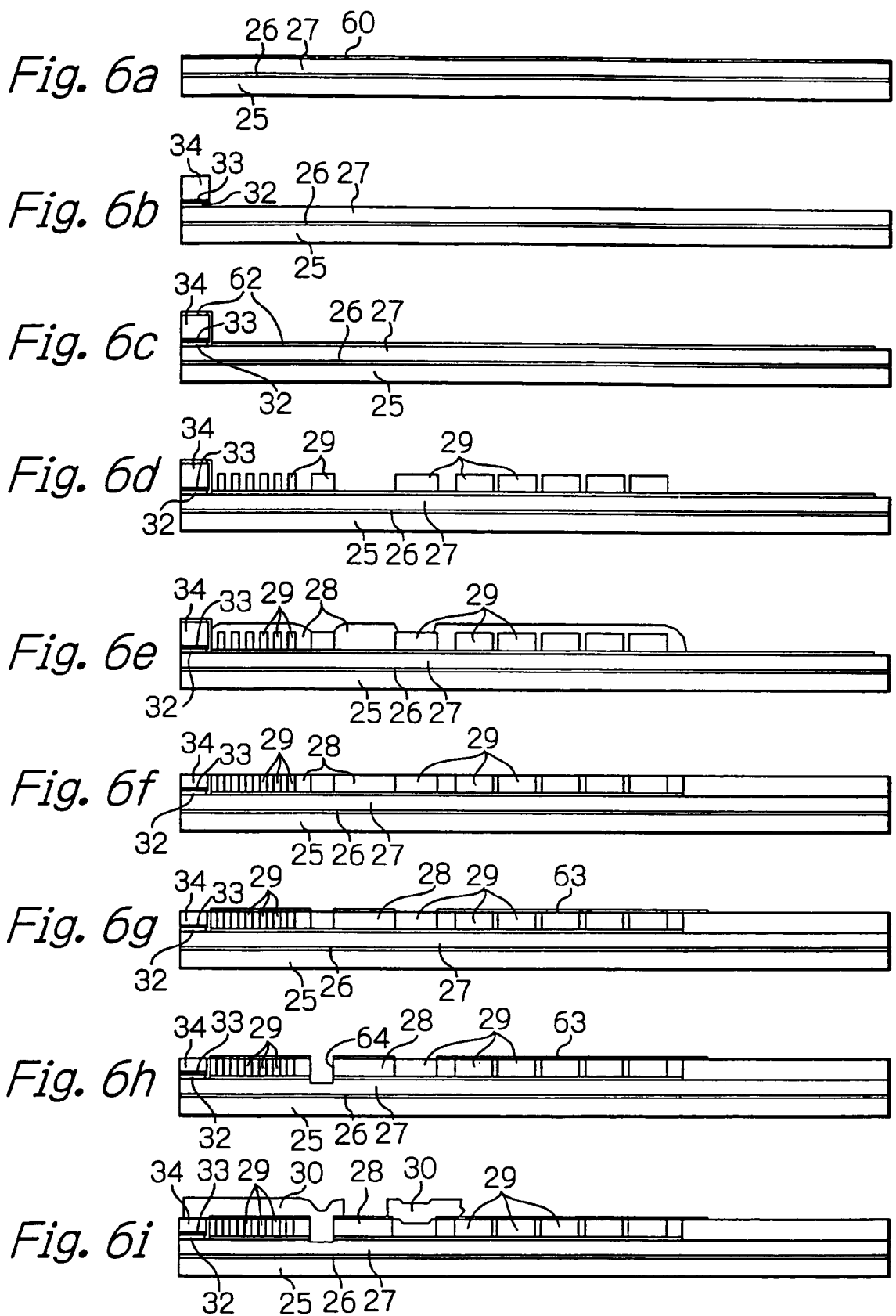

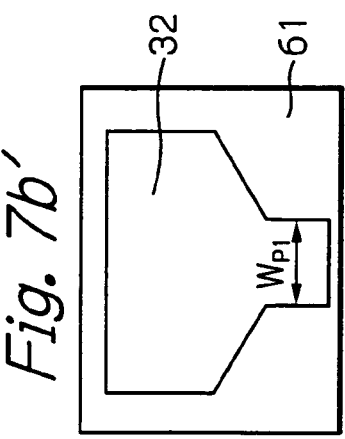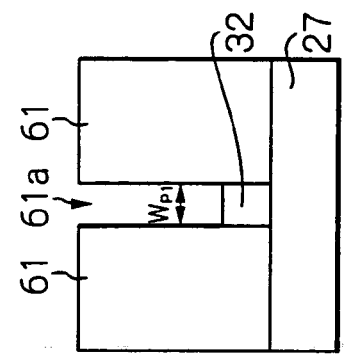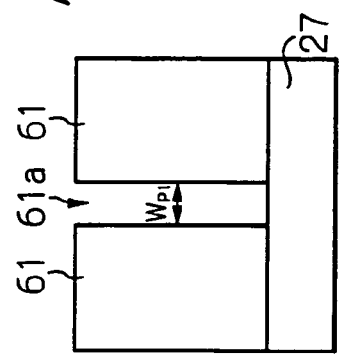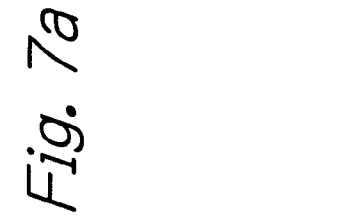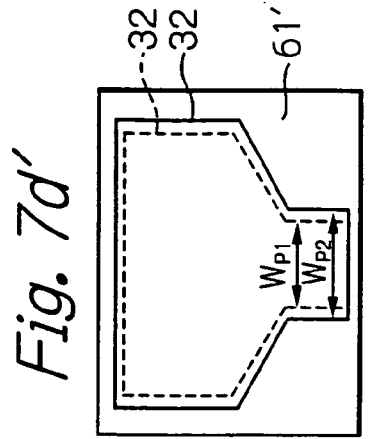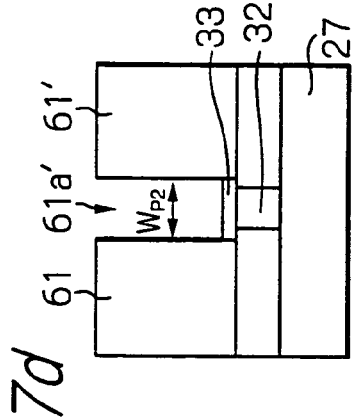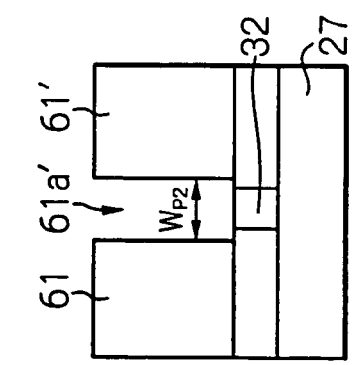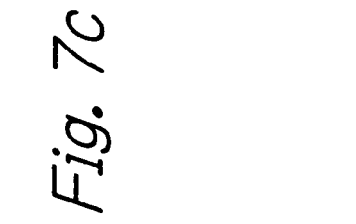

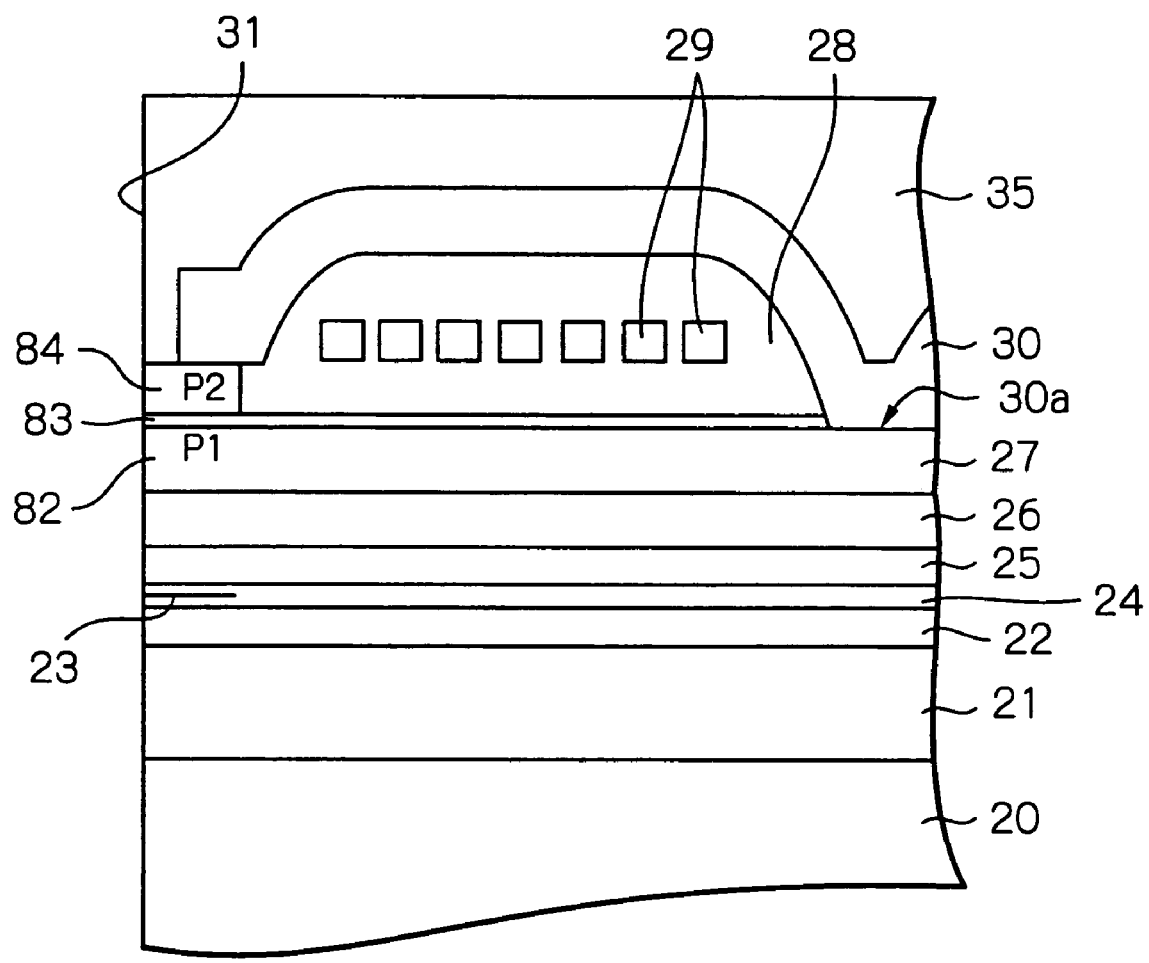

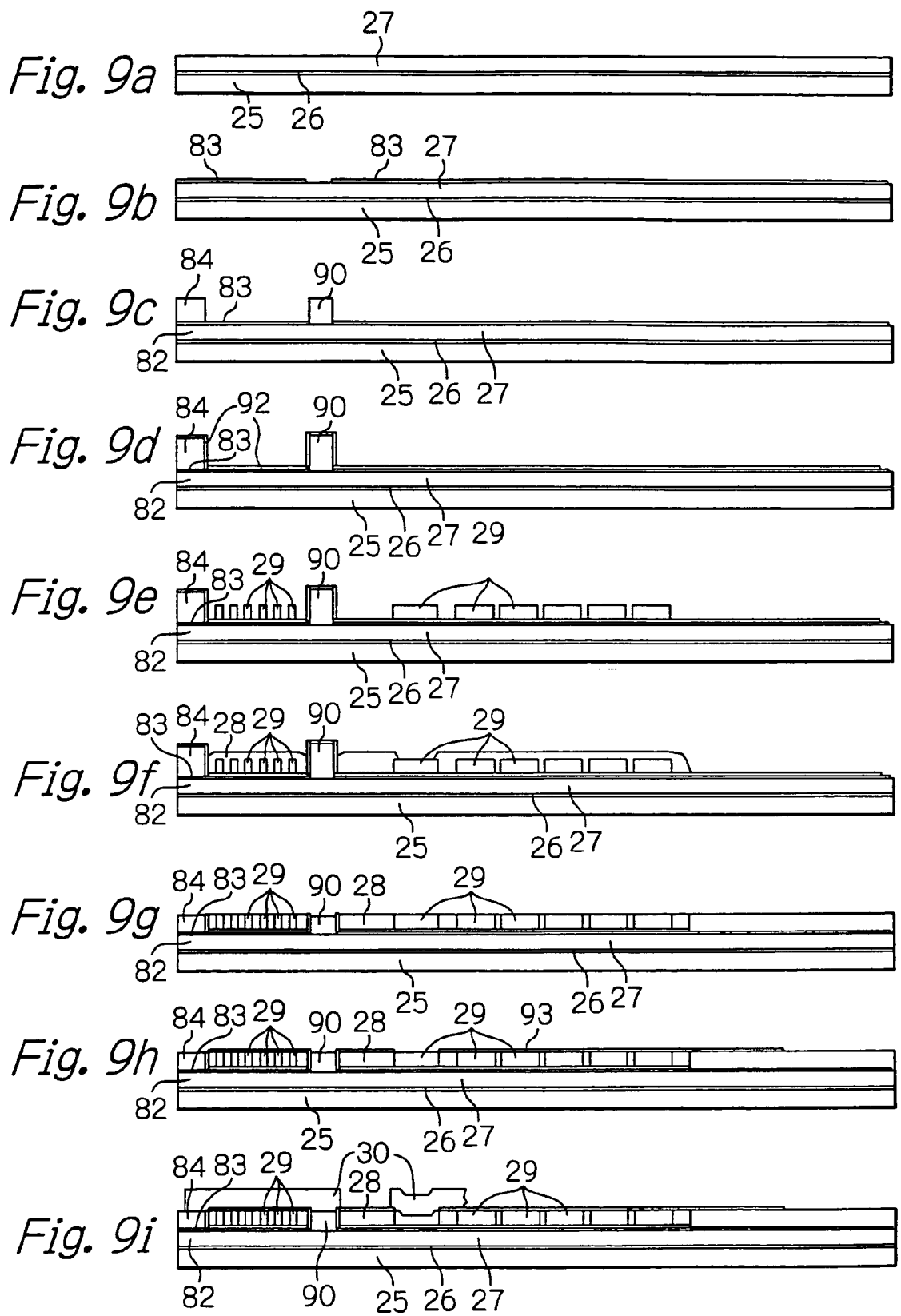

THIN-FILM MAGNETIC HEAD, HEAD GIMBAL ASSEMBLY WITH THIN-FILM MAGNETIC HEAD, HEAD ARM ASSEMBLY WITH HEAD GIMBAL ASSEMBLY, MAGNETIC DISK DRIVE APPARATUS WITH HEAD GIMBAL ASSEMBLY AND MANUFACTURING METHOD OF THIN-FILM MAGNETIC HEAD

PRIORITY CLAIM

This application claims priority from Japanese patent application No. 2004-163121, filed on Jun. 1, 2004, which is incorporated herein by reference.

BACKGROUND OF THE INVENTION

1. Field of the Invention

The present invention relates to a thin-film magnetic head with an inductive element, a head gimbal assembly (HGA) with the thin-film magnetic head, a head arm assembly (HAA) with the HGA, a magnetic disk drive apparatus with the HGA, and a manufacturing method of the thin-film magnetic head.

2. Description of the Related Art

In an inductive write head element of a thin film magnetic head, a lower magnetic pole and an upper magnetic pole are usually formed so that their shapes viewed through from their stacked-surface side are almost equal to each other. That is to say, the lower magnetic pole and the upper magnetic pole are formed so that widths at their top ends facing a magnetic medium (widths in the track-width direction) are equal to each other. Here, "top" means an extremity facing the magnetic medium in the direction perpendicular to the air bearing surface (ABS).

In Japanese Patent Publication No. 06-036234A filed by the present assignee, a magnetic head in which the top end widths of the lower magnetic pole and the upper magnetic pole are equal to each other, a magnetic head in which the top end width of the lower magnetic pole is larger than that of the upper magnetic pole, and a magnetic head in which the top end width of the upper magnetic pole is larger than that of the lower magnetic pole are described. However, in the publication, only the magnetic head in which the top end width of the upper magnetic pole is larger than that of the lower magnetic pole in order to decrease fringing fields generated from the side portion of the upper magnetic pole is claimed.

In the case where the top end widths of the lower magnetic pole and the upper magnetic pole are equal to each other as a conventional magnetic head, when the magnetic head is skewed with respect to a recorded track on the magnetic medium, an edge of the lower magnetic pole, which is adjacent to a write gap layer, is run off toward an adjacent track, and is at a risk of erasing some signals on the adjacent track. The risk becomes much higher due to the narrower track width according to heightened recording density.

This influence to the adjacent track when skewed becomes somewhat smaller by making the top end width of the upper magnetic pole larger than that of the lower magnetic pole, however, not small enough.

BRIEF SUMMARY OF THE INVENTION

It is therefore an object of the present invention to provide a thin-film magnetic head, an HGA with the thin-film magnetic head, an HAA with the HGA, a magnetic disk drive apparatus with the HGA, and a manufacturing method of the thin-film magnetic head, whereby a distribution of magnetic field that the magnetic medium actually senses can be improved more greatly.

According to the present invention, a thin-film magnetic head comprising an inductive element including at least: a lower magnetic pole; a write gap layer; and an upper magnetic pole opposed to the lower magnetic pole through the write gap layer, a width $W_{P2}$ in a track-width direction at a facing-to-magnetic-medium top end of the upper magnetic pole being larger than a width $W_{P1}$ in the track-width direction at a facing-to-magnetic-medium top end of the lower magnetic pole, and a distance $FPD_{P2}$ between the top end of the upper magnetic pole and a flare point of the upper magnetic pole being smaller than a distance $FPD_{P1}$ between the top end of the lower magnetic pole and a flare point of the lower magnetic pole, is provided.

By setting conditions where $W_{P1}<W_{P2}$ and $FPD_{P1}>FPD_{P2}$, the shape of the distribution of the magnetic field that the magnetic medium actually senses becomes an ideal inverted trapezoid where the magnetic field becomes large in the side of the upper magnetic pole. Consequently, a write gap magnetic field increases, and especially, a write quality during a skew operation becomes excellently good.

Preferably, an area in a stacked surface of the upper magnetic pole is larger than an area in a stacked surface of the lower magnetic pole.

Preferably, a width in the track-width direction at an opposite-to-magnetic-medium rear end of the upper magnetic pole is equal to a width in the track-width direction at an opposite-to-magnetic-medium rear end of the lower magnetic pole.

A width in the track-width direction at an opposite-to-magnetic-medium rear end of the upper magnetic pole is also preferably larger than a width in the track-width direction at an opposite-to-magnetic-medium rear end of the lower magnetic pole.

More preferably, a length between the top end and the rear end of the upper magnetic pole is equal to a length between the top end and the rear end of the lower magnetic pole, or a length between the top end and the rear end of the upper magnetic pole is larger than a length between the top end and the rear end of the lower magnetic pole.

Preferably, the inductive element further includes a lower yoke layer joined magnetically with the lower magnetic pole, and the lower magnetic pole is formed as an independent layer of the lower yoke layer, or as a part of the lower yoke layer.

Preferably, the thin-film magnetic head further comprises a magnetoresistive effect element.

According to the present invention, an HGA comprising the above-mentioned thin film magnetic head and a suspension supporting the thin film magnetic head, is provided, and an HAA comprising the HGA is provided. And also according to the present invention, a magnetic disk drive apparatus comprising at least one magnetic recording medium, at least one of the HGA and a means for moving at least one of the HGA on the at least one magnetic recording medium, is further provided.

According to the present invention, a manufacturing method of a thin film magnetic head comprising steps of: forming a lower magnetic pole by means of a resist mask layer with a first pattern which is formed on a lower yoke layer; and forming an upper magnetic pole opposed to the lower magnetic pole through a write gap layer by means of a resist mask layer with a second pattern where a width in a track-width direction at a top end opposed to a magnetic medium is larger than that in the first pattern, is further provided.

By forming the lower magnetic pole and the upper magnetic pole by means of the resist mask layers with these first and second patterns respectively, a thin film magnetic head that has conditions of $W_{P1}<W_{P2}$ and $FPD_{P1}>FPD_{P2}$ can be easily provided. By using the thin film magnetic head, the shape of the distribution of the magnetic field that the magnetic medium actually senses becomes an ideal inverted trapezoid. Consequently, a write gap magnetic field increases, and especially, a write quality during a skew operation becomes excellently good.

Preferably, the write gap layer is formed by depositing with the use of the resist mask layer with the second pattern or the first pattern.

According to the present invention, a manufacturing method of a thin film magnetic head comprising steps of: forming a resist mask layer with a first pattern on a lower yoke layer; forming a lower magnetic pole by means of the resist mask layer with the first pattern; forming a write gap layer by means of the resist mask layer with the first pattern; forming an upper magnetic pole opposed to the lower magnetic pole through the write gap layer by means of a resist mask layer with a second pattern where a width in a track-width direction at a top end opposed to a magnetic medium is larger than that in the first pattern and a distance between the top end and a flare point is smaller than that in the first pattern; and removing the resist mask layer, is further provided.

According to the present invention, a manufacturing method of a thin film magnetic head comprising steps of: forming a resist mask layer with a first pattern on a lower yoke layer; forming a lower magnetic pole by means of the resist mask layer with the first pattern; forming a write gap layer and an upper magnetic pole opposed to the lower magnetic pole through the write gap layer, by means of a resist mask layer with a second pattern where a width in a track-width direction at a top end opposed to a magnetic medium is larger than that in the first pattern and a distance between the top end and a flare point is smaller than that in the first pattern; and removing the resist mask layer, is further provided.

Preferably, the resist mask layer with the second pattern is formed by spreading a pattern width of the resist mask layer with the first pattern, and more preferably, the pattern width is spread by means of ashing technique or wet-etching technique.

According to the present invention, a manufacturing method of a thin film magnetic head comprising steps of: forming a write gap layer on a lower yoke layer; forming an upper magnetic pole by means of a resist mask layer formed on the write gap layer; removing the resist mask layer; and forming a lower magnetic pole where a width in a track-width direction at a top end opposed to a magnetic medium is larger than that in the upper magnetic pole and a distance between the top end and a flare point is smaller than that in the upper magnetic pole, by dry-etching the lower yoke layer with the use of the upper magnetic pole as a mask, is further provided.

By dry-etching the lower yoke layer with the use of the upper magnetic pole as a mask, a thin film magnetic head that has conditions of $W_{P1}<W_{P2}$ and $FPD_{P1}>FPD_{P2}$ can be easily provided. By using the thin film magnetic head, the shape of the distribution of the magnetic field that the magnetic medium actually senses becomes an ideal inverted trapezoid. Consequently, a write gap magnetic field increases, and especially, a write quality during a skew operation becomes excellently good.

In the case, the write gap layer is preferably formed of a material with an etching rate during one etching process higher than an etching rate during the same etching process of a constituent material of the upper magnetic pole.

Further objects and advantages of the present invention will be apparent from the following description of the preferred embodiments of the invention as illustrated in the accompanying drawings.

BRIEF DESCRIPTION OF THE SEVERAL VIEWS OF THE DRAWINGS

FIGS. 4a to 4c show plain views illustrating shapes in the stacked surfaces of the lower magnetic pole and the upper magnetic pole in a conventional thin film magnetic head, the thin film magnetic head shown in FIG. 2, and its alternative;

FIGS. 6a to 6i show cross-sectional views explaining the forming process of the inductive write head element in the manufacturing method of the thin film magnetic head according to the embodiment shown in FIG. 1;

FIGS. 7a to 7f show cross-sectional and plain views explaining the forming process of the upper magnetic pole and the lower magnetic pole shown in fig, 6;

FIG. 8 shows a cross-sectional view schematically illustrating a structure of a thin-film magnetic head according to another embodiment of the present invention;

FIGS. 9a to 9i show cross-sectional views explaining the forming process of the inductive write head element in the manufacturing method of the thin film magnetic head according to the embodiment shown in FIG. 8.

DETAILED DESCRIPTION OF THE INVENTION

Figure 1:
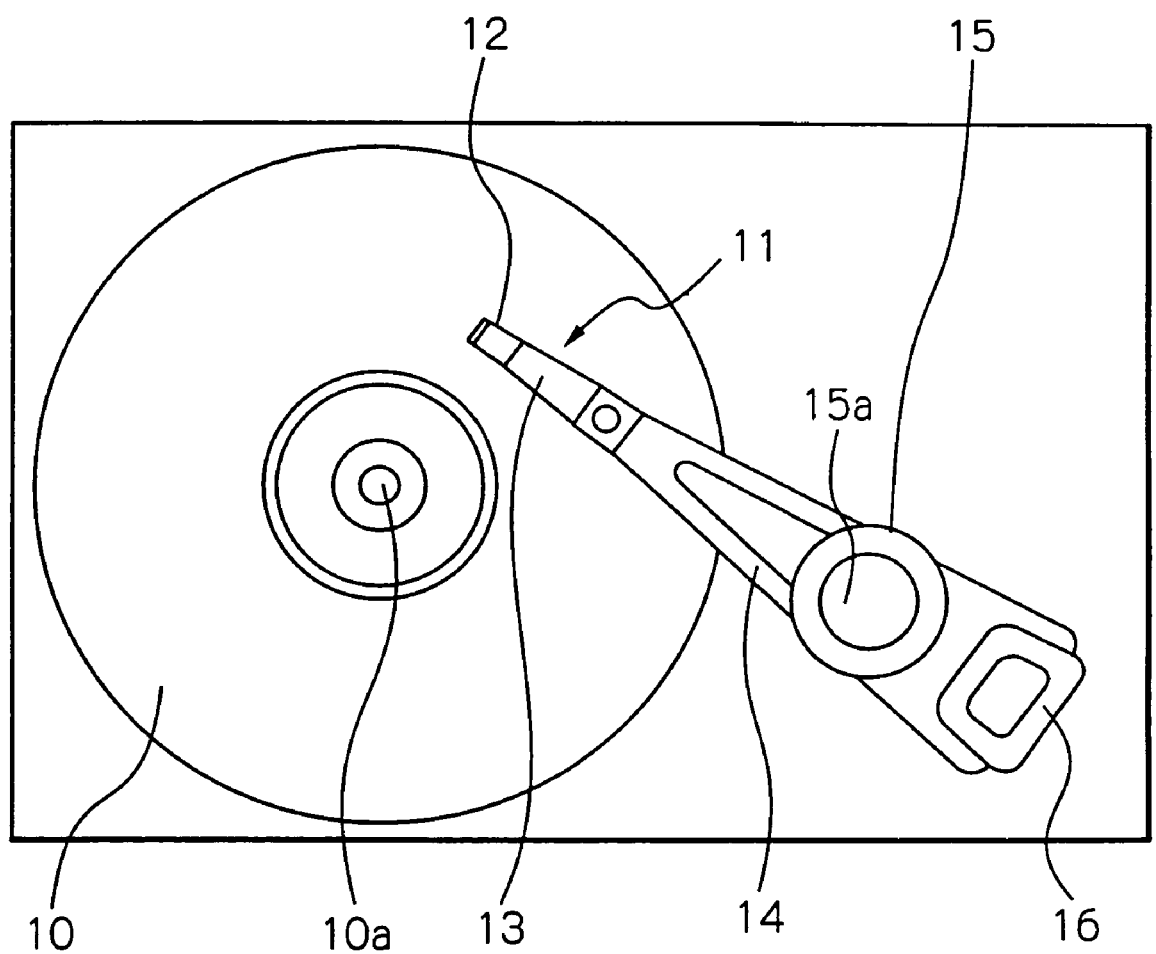
FIG. 1 shows a plain view schematically illustrating a configuration of a magnetic disk drive apparatus according to one embodiment of the present invention.

FIG. 1 shows a plain view schematically illustrating a configuration of a magnetic disk drive apparatus according to one embodiment of the present invention.

In FIG. 1, reference numeral 10 indicates a plurality of magnetic disks or a single magnetic disk rotating during operation around a rotation axis 10a, and 11 indicates an HGA having a magnetic head slider 12 with at least one thin film magnetic head formed on its rear end surface and a suspension 13 supporting the magnetic head slider 12 on its top end section, respectively. The HGA 11 is fixed at the top end section of a support arm 14. The support arm 14 is rotatable around an axis 15a through a carriage 15. The carriage 15 is driven rotatably by an actuator formed by, for example, a voice coil motor (VCM). Reference numeral 16 indicates a drive coil of the VCM.

Figure 2:
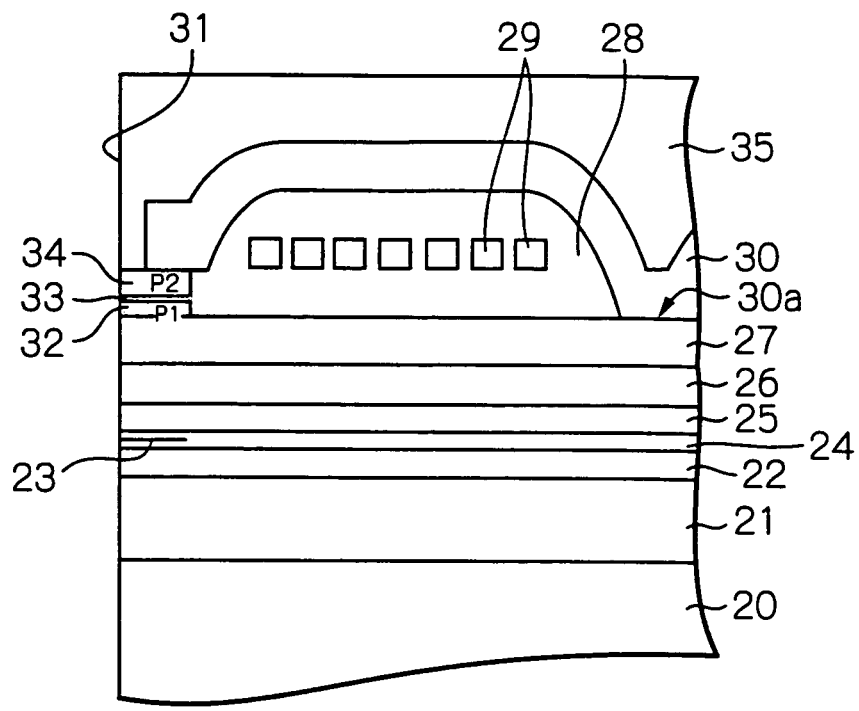
FIG. 2 shows a cross-sectional view schematically illustrating a structure of the thin-film magnetic head according to the embodiment shown in FIG. 1.

FIG. 2 shows a cross-sectional view schematically illustrating a structure of the thin-film magnetic head according to the embodiment shown in FIG. 1.

Hereinafter, a layered structure of the thin film magnetic head according to the present embodiment will be described with reference to FIG. 2. On a rear end surface of a magnetic head slider substrate 20 made of a ceramic, for example, $Al_2O_3$—TiC, etc., a base film 21 is formed of a sputtered electrically insulating material such as $Al_2O_3$ or a $SiO_2$. On the base film 21, a lower shield layer 22 is formed of a plated Ni—Fe alloy such as Permalloy.

On the lower shield layer 22, an MR element 23 such as a giant magnetoresistive effect (GMR) element is so formed as to be interposed to gap insulating films 24. That is to say, the MR element 23 is formed by stacking a GMR multilayer on the lower gap insulating film formed of a sputtered $Al_2O_3$, etc., and patterning the stacked GMR multilayer. In the MR element 23, leads (not shown in the figure) are formed of a plated Cu, etc., and a bias layer for giving a bias to the MR element 23 is formed if needed. On the MR element 23, the leads and the lower gap insulating film, an upper gap insulating film is formed of a sputtered $Al_2O_3$, etc., and the above-mentioned gap insulating films 24 are thereby formed.

On the gap insulating films 24, an upper shield layer is formed of a plated Ni—Fe alloy such as Permalloy.

The lower shield layer 22, the MR element 23, the leads, the gap insulating films 24 and the upper shield layer 25 constitute an MR read head element.

A non-magnetic film 26 is formed of a sputtered $Al_2O_3$ or Pt, etc. on the upper shield layer 25.

On the non-magnetic film 26, a lower yoke layer 27 is formed of a plated Ni—Fe alloy such as Permalloy, and a coil conductor 29 is so formed thereon of Cu, etc. as to be interposed to insulating layers 28 made of a resist material, etc., and thereon, an upper yoke layer 30 is formed of a plated Ni—Fe alloy such as Permalloy.

In the side of a surface 31 facing the magnetic medium, a lower magnetic pole 32 is formed of a plated Ni—Fe alloy such as Permalloy on an upper surface of the lower yoke layer 27. On the lower magnetic pole 32, a write gap layer 33 is formed of a sputtered $Al_2O_3$ or $SiO_2$, etc., and on the write gap layer 33, an upper magnetic pole 34 is formed of a plated Ni—Fe alloy such as Permalloy. The lower magnetic pole 32 and the upper magnetic pole 34 are coupled magnetically with the lower yoke layer 27 and the upper yoke layer 30, respectively.

The lower yoke layer 27 and the upper yoke layer 30 are coupled magnetically with each other at their section 30a opposite to the surface 31 facing the magnetic medium. The coil conductor 29 is so formed as to be wound spirally around the coupled section 30a of the lower yoke layer 27 and the upper yoke layer 30.

A protective film 35 is formed of a sputtered $Al_2O_3$ or $SiO_2$, etc. on the upper yoke layer 30.

Here, it is evident that the lower yoke layer 27 may serve not only as a function itself, but also as a function of the upper shield layer 25, instead of it. In the case, the non-magnetic film 26 is omitted as is obvious.

Figure 3:
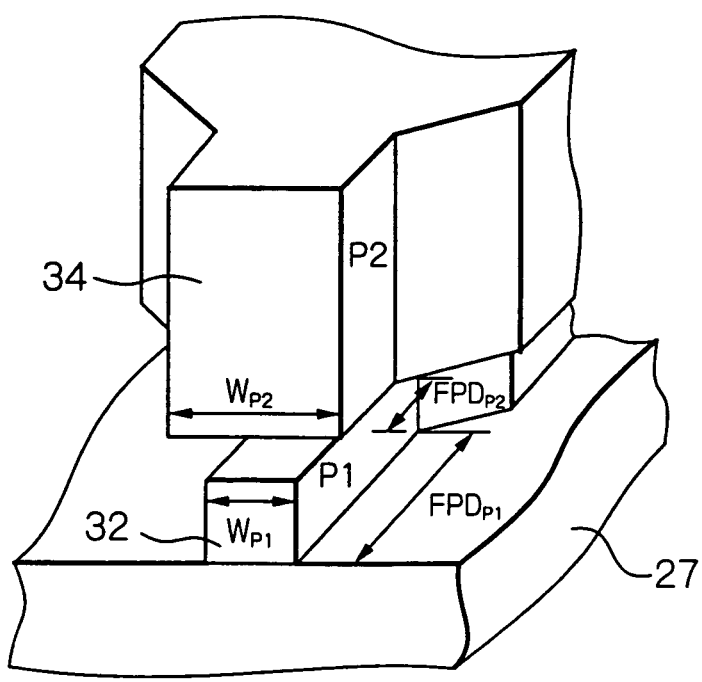
FIG. 3 shows a perspective view schematically illustrating the structure of the lower magnetic pole and the upper magnetic pole of the inductive write head element in the thin film magnetic head shown in FIG. 2.

FIG. 3 shows a perspective view schematically illustrating the structure of the lower magnetic pole and the upper magnetic pole of the inductive write head element in the thin film magnetic head shown in FIG. 2. And FIGS. 4a to 4c show plain views illustrating shapes in the stacked surfaces of the lower magnetic pole and the upper magnetic pole in a conventional thin film magnetic head, the thin film magnetic head shown in FIG. 2, and its alternative.

As shown in FIG. 4a, in the conventional thin film magnetic head, the shapes in the stacked surfaces of the lower magnetic pole 42 and the upper magnetic pole 44 are almost equal to each other. Therefore, widths $W_{P1}$ and $W_{P2}$ (widths in the track-width direction) at the top ends facing the magnetic medium in the lower magnetic pole 42 and the upper magnetic pole 44 are equal to each other, and distances $FPD_{P1}$ and $FPD_{P2}$ between the top end facing the magnetic medium and a flare point of the respective magnetic poles are also equal to each other. Here, the "flare point" means a point at which a width of the upper and/or lower magnetic pole in the track-width direction starts to spread in its stacked surface.

In the present embodiment, as shown in FIGS. 3 and 4b, the area in the stacked surface of the lower magnetic pole 32 becomes larger than that of the upper magnetic pole 34. In other words, the width $W_{P2}$ (the width in the track-width direction) at the top end facing the magnetic medium in the upper magnetic pole 34 becomes larger than the width $W_{P1}$ (the width in the track-width direction) at the top end facing the magnetic medium in the lower magnetic pole 32, and the distance $FPD_{P2}$ between the top end facing the magnetic medium and the flare point of the upper magnetic pole 34 becomes smaller than the distance $FPD_{P1}$ between the top end facing the magnetic medium and the flare point of the lower magnetic pole 32.

Thus, by setting conditions where $W_{P1} < W_{P2}$ and $FPD_{P1} > FPD_{P2}$, the shape of the distribution of the magnetic field that the magnetic medium actually senses becomes an ideal inverted trapezoid where the magnetic field becomes large near the upper magnetic pole 34. Consequently, a write gap magnetic field increases, and especially, a write quality during a skew operation becomes excellently good.

Figure 5:
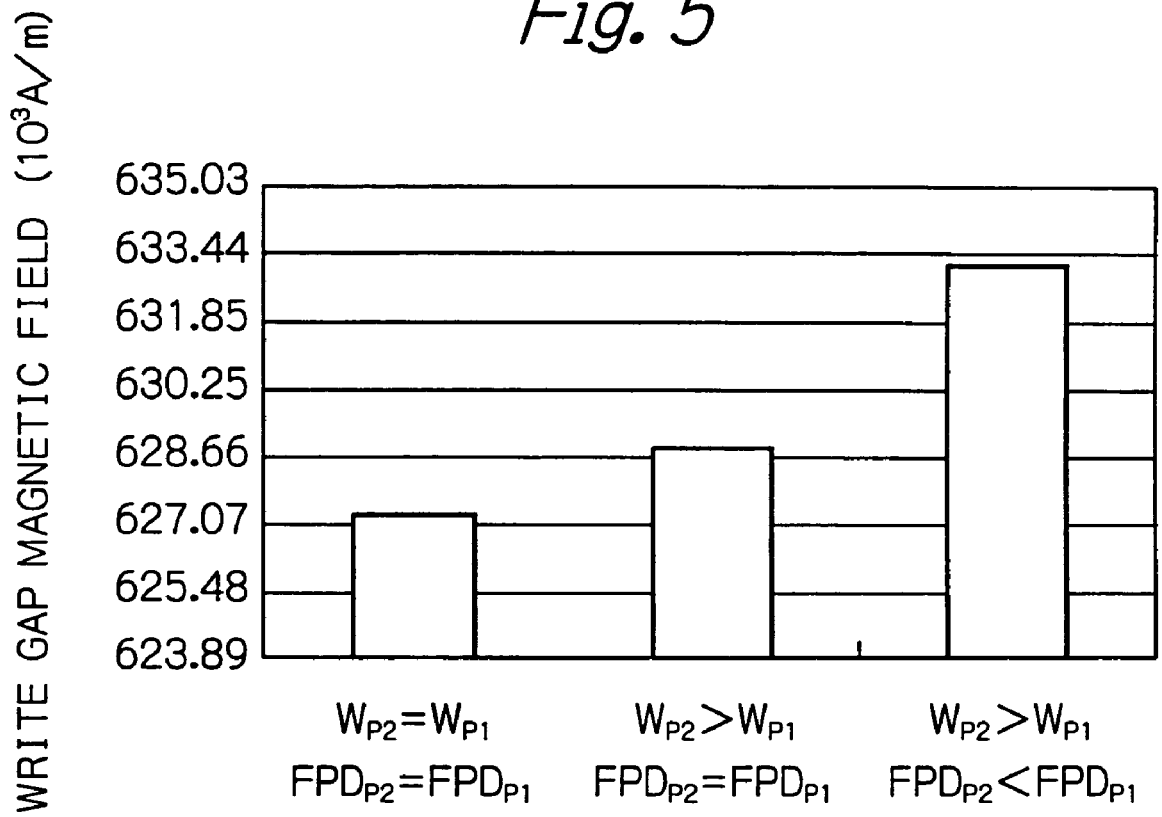
FIG. 5 shows a graph illustrating the result of simulation on how the write gap magnetic field changes according to the variation in the shapes of the lower magnetic pole and the upper magnetic pole.

FIG. 5 shows a graph illustrating the result of simulation on how the write gap magnetic field changes according to the variation in the shapes of the lower magnetic pole and the upper magnetic pole. In the simulation, the lower magnetic pole 32 and the upper magnetic pole 34 are made of FeCoNi with saturation flux density 23 kG, $W_{P1}$=0.18 μm, $W_{P2}$=0.20 μm, and a gap length is 0.09 μm. In addition, some results of simulations under the conditions using other materials show the same tendency.

In the conventional thin film magnetic head where the top end widths of the upper and lower magnetic poles are equal to each other ($W_{P1} = W_{P2}$) and the distances between the top end and the flare point of the respective magnetic poles are equal to each other ($FPD_{P1} = FPD_{P2}$), the write gap magnetic field is $627.26*10^3$ A/m (7882.4 Oe). In the case of the magnetic poles' shapes where the distances between the top end and the flare point of the respective magnetic poles are also equal to each other ($FPD_{P1} = FPD_{P2}$) but the top end widths of the magnetic poles show the relation of $W_{P1} < W_{P2}$, the write gap magnetic field shows a larger value of $628.81*10^3$ A/m (7901.8 Oe). Furthermore, in the present embodiment where the top end widths of the magnetic poles show the relation of $W_{P1} < W_{P2}$ and the distances between the top end and the flare point of the respective magnetic poles show the relation of $FPD_{P1} > FPD_{P2}$, the write gap magnetic field shows a much larger value of $633.18*10^3$ A/m (7956.8 Oe). The great larger value effects an excellent good write quality, especially during a skew operation.

In the present embodiment, as shown in FIG. 4b, the area in the stacked surface of the lower magnetic pole 32 becomes larger than that of the upper magnetic pole 34. Especially, the width in the track-width direction at the rear end opposite to the magnetic medium in the upper magnetic pole 34 becomes larger than the width in the track-width direction at the rear end opposite to the magnetic medium in the lower magnetic pole 32, and the length between the front end and the rear end of the upper magnetic pole 34 becomes larger than the length between the front end and the rear end of the lower magnetic pole 32.

While, as shown in FIG. 4c, also preferably, in the condition where widths in the track-width direction at the respective rear ends opposite to the magnetic medium in the upper magnetic pole 34' and the lower magnetic pole 32' are equal to each other and the lengths between the front and rear ends in each of the upper and lower magnetic pole 34' and 32' are equal to each other, the relation of $W_{P1}<W_{P2}$ and $FPD_{P1}>FPD_{P2}$ is provided, and the area in the stacked surface of the lower magnetic pole 32' becomes larger than that of the upper magnetic pole 34'.

FIGS. 6a to 6i show cross-sectional views explaining the forming process of the inductive write head element in the manufacturing method of the thin film magnetic head according to the present embodiment, and FIGS. 7a to 7f show cross-sectional and plain views explaining the forming process of the upper magnetic pole and the lower magnetic pole.

Hereinafter, a part of the manufacturing process of the thin film magnetic head according to the present embodiment will be described with reference to these figures.

First, the above-mentioned MR read head element is formed on a wafer substrate by performing the publicly known manufacturing process. On the upper shield layer 25 of the MR read head element, the non-magnetic film 26 is formed by sputtering $Al_2O_3$ or a Pt, etc. Thereon, the lower yoke layer 27 is formed by plating a Ni—Fe alloy such as Permalloy. Then, after planarizing the surface of the lower yoke layer 27 by chemical mechanical polishing (CMP) method and so on, a plate electrode film 60 is deposited, as shown in FIG. 6a.

Next, as shown in FIG. 6b, the lower magnetic pole 32, the write gap layer 33 and the upper magnetic pole 34 are sequentially formed. Hereinafter, this process will be described in detail with reference to FIGS. 7a to 7f.

First, a photoresist layer is formed by application, then a resist mask layer 61 that has a first pattern as shown in FIG. 7a are formed by patterning with exposure and development. Here, the first pattern means a pattern that has an opening 61a for forming the lower magnetic pole, in which the width of the top end in the facing side to the magnetic medium (width in the track-width direction) is $W_{P1}$ and the distance between the top end in the facing side to the magnetic medium and the flare point is $FPD_{P1}$.

Next, the lower magnetic pole 32 is formed by plating a Ni—Fe alloy such as Permalloy with the use of the resist mask layer 61, as shown in FIGS. 7b and 7b'.

Then, as shown in FIG. 7c, a resist mask layer 61' that has a second pattern is formed by spreading the opening 61a with ashing process or wet-etching process using alkaline solution, without removing the resist mask layer 61. Here, the second pattern means a pattern that has an opening 61a' for forming the upper magnetic pole, in which the width of the top end in the facing side to the magnetic medium (width in the track-width direction) is $W_{P2}$ ($W_{P1}<W_{P2}$) and the distance between the top end in the facing side to the magnetic medium and the flare point is $FPD_{P2}$ ($FPD_{P1}>FPD_{P2}$).

Then, the write gap layer 33 is formed by sputtering $Al_2O_3$ or a $SiO_2$, etc. with the use of the resist mask layer 61', as shown in FIGS. 7d and 7d'. Obviously, the write gap layer 33 may be formed by using the resist mask layer 61 with the first pattern in which the opening is not spread yet.

Then, on the write gap layer 33, the upper magnetic pole 34 is formed by plating a Ni—Fe alloy such as Permalloy with the use of the resist mask layer 61', as shown in FIG. 7e.

Then, the resist mask layer 61' is removed, and, as shown in FIG. 7f, the top end widths $W_{P1}$ and $W_{P2}$ of the magnetic poles are adjusted by performing dry-etching process such as ion milling.

By the above-described process, the lower magnetic pole 32 and the upper magnetic pole 34 is obtained, where $W_{P1}<W_{P2}$ and $FPD_{P1}>FPD_{P2}$.

Then, as shown in FIG. 6c, an insulating film 62 for protecting the magnetic poles is formed by sputtering $Al_2O_3$, etc., and as shown in FIG. 6d, the coil conductor 29 is formed by plating Cu, etc. And as shown in FIG. 6e, the insulating layer 28 for isolating the coil lines from each other is formed of a resist material, etc.

Then, as shown in FIG. 6f, the upper surfaces of the upper magnetic pole 34, the coil conductor 29 and the insulating film 28 are planarized by polishing with the CMP method, etc., and as shown in FIG. 6g, an insulating film 63 for isolating the upper portion of the coil conductor 29 is formed by sputtering $Al_2O_3$, etc. Furthermore, as shown in FIG. 6h, a hole 64 for forming a back gap is formed.

Then, as shown in FIG. 6i, the upper yoke layer 30 is formed by plating a Ni—Fe alloy such as Permalloy.

Because a wafer process afterward and a process for cutting and working the wafer performed after the wafer process are well known, the explanation of the processes will be omitted.

FIG. 8 shows a cross-sectional view schematically illustrating a structure of a thin-film magnetic head according to another embodiment.

Hereinafter, a layered structure of the thin film magnetic head according to the present embodiment will be described with reference to FIG. 8. In this figure, the same elements as those shown in FIG. 2 are designated with the same reference numerals. On a rear end surface of a magnetic head slider substrate 20 made of a ceramic, for example, $Al_2O_3$—TiC, etc., a base film 21 is formed of a sputtered electrically insulating material such as $Al_2O_3$ or a $SiO_2$. On the base film 21, a lower shield layer 22 is formed of a plated Ni—Fe alloy such as Permalloy.

On the lower shield layer 22, an MR element 23 such as a GMR element is so formed as to be interposed to gap insulating films 24. That is to say, the MR element 23 is formed by stacking a GMR multilayer on the lower gap insulating film formed of a sputtered $Al_2O_3$, etc., and patterning the stacked GMR multilayer. In the MR element 23, leads (not shown in the figure) is formed of a plated Cu, etc., and a bias layer for giving a bias to the MR element 23 is formed if needed. On the MR element 23, the leads and the lower gap insulating film, an upper gap insulating film is formed of a sputtered $Al_2O_3$, etc., and the above-mentioned gap insulating films 24 are thereby formed.

On the gap insulating films 24, an upper shield layer 25 is formed of a plated Ni—Fe alloy such as Permalloy.

The lower shield layer 22, the MR element 23, the leads, the gap insulating films 24 and the upper shield layer 25 constitute an MR read head element.

A non-magnetic film 26 is formed of a sputtered $Al_2O_3$ or Pt, etc. on the upper shield layer 25.

On the non-magnetic film 26, a lower yoke layer 27 is formed of a plated Ni—Fe alloy such as Permalloy, and on the lower yoke layer 27, a write gap layer 83 is formed of a sputtered $Al_2O_3$ or $SiO_2$, etc. A coil conductor 29 is so formed thereon of Cu, etc. as to be interposed to insulating layers 28 made of a resist material, etc., and thereon, an upper yoke layer 30 is formed of a plated Ni—Fe alloy such as Permalloy.

In the side of a surface 31 facing the magnetic medium, a lower magnetic pole 82 is formed by etching a portion of the lower yoke layer 27. On the lower magnetic pole 82, the above-mentioned write gap layer 83 is formed, and on the write gap layer 83, an upper magnetic pole 84 is formed of a plated Ni—Fe alloy such as Permalloy. The lower magnetic pole 82 and the upper magnetic pole 84 are coupled magnetically with the lower yoke layer 27 and the upper yoke layer 30, respectively.

The lower yoke layer 27 and the upper yoke layer 30 are coupled magnetically with each other at their section 30a opposite to the surface 31 facing the magnetic medium. The coil conductor 29 is so formed as to be wound spirally around the coupled section 30a of the lower yoke layer 27 and the upper yoke layer 30.

A protective film 35 is formed of a sputtered $Al_2O_3$ or $SiO_2$, etc. on the upper yoke layer 30.

Here, it is evident that the lower yoke layer 27 may serve not only as a function itself, but also as a function of the upper shield layer 25, instead of it. In the case, the non-magnetic film 26 is omitted as is obvious.

In the present embodiment, as well as described with reference to FIGS. 3 and 4b, the area in the stacked surface of the lower magnetic pole 82 becomes larger than that of the upper magnetic pole 84. In other words, the width $W_{P2}$ (the width in the track-width direction) at the top end facing the magnetic medium in the upper magnetic pole 84 becomes larger than the width $W_{P1}$ (the width in the track-width direction) at the top end facing the magnetic medium in the lower magnetic pole 82, and the distance $FPD_{P2}$ between the top end facing the magnetic medium and the flare point of the upper magnetic pole 84 becomes smaller than the distance $FPD_{P1}$ between the top end facing the magnetic medium and the flare point of the lower magnetic pole 82.

Thus, by setting conditions where $W_{P1} < W_{P2}$ and $FPD_{P1} > FPD_{P2}$, the shape of the distribution of the magnetic field that the magnetic medium actually senses becomes an ideal inverted trapezoid. Consequently, a write gap magnetic field increases, and especially, a write quality during a skew operation becomes excellently good.

FIGS. 9a to 9i show cross-sectional views explaining the forming process of the inductive write head element in the manufacturing method of the thin film magnetic head according to the present embodiment, and FIGS. 10a to 10d' show cross-sectional and plain views explaining the forming process of the upper magnetic pole and the lower magnetic pole.

Hereinafter, a part of the manufacturing process of the thin film magnetic head according to the present embodiment will be described with reference to these figures.

First, the above-mentioned MR read head element is formed on a wafer substrate by performing the publicly known manufacturing process. On the upper shield layer 25 of the MR read head element, the non-magnetic film 26 is formed by sputtering $Al_2O_3$ or a Pt, etc. Thereon, the lower yoke layer 27 is formed by plating a Ni—Fe alloy such as Permalloy. Then, as shown in FIG. 9a, the surface of the lower yoke layer 27 is planarized by CMP method and so on.

Next, as shown in FIG. 9b, the write gap layer 83 is formed by sputtering a high-etching-rate material such as Au or Cu which has an etching rate during milling higher than that of the constituent material of the lower and upper magnetic poles.

Then, as shown in FIG. 9c, the forming process of the lower magnetic pole 82 is performed, and the upper magnetic pole 84 and a back gap portion 90 of the yoke are formed. Hereinafter, this process will be described in detail with reference to FIGS. 10a to 10d'.

Figure 10A:
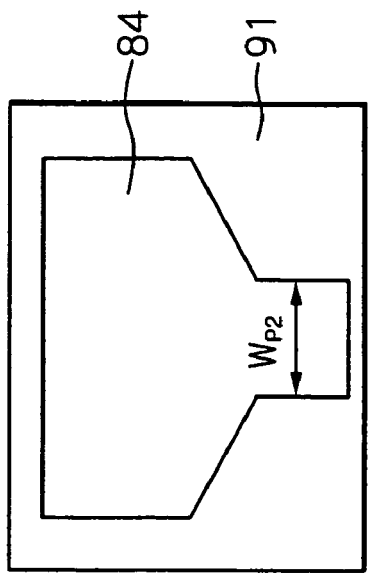
FIGS. 10a to 10d' show cross-sectional and plain views explaining the forming process of the upper magnetic pole and the lower magnetic pole shown in FIG. 9.

First, a photoresist layer is formed by application, then a resist mask layer 91 that has a second pattern as shown in FIG. 10a are formed by patterning with exposure and development. Here, the second pattern means a pattern that has an opening 91a for forming the upper magnetic pole, in which the width of the top end in the facing side to the magnetic medium (width in the track-width direction) is $W_{P2}$ and the distance between the top end in the facing side to the magnetic medium and the flare point is $FPD_{P2}$.

Figure 10B:
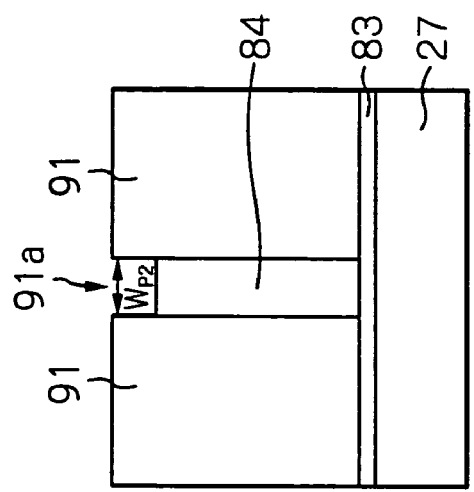
Figure 10B:
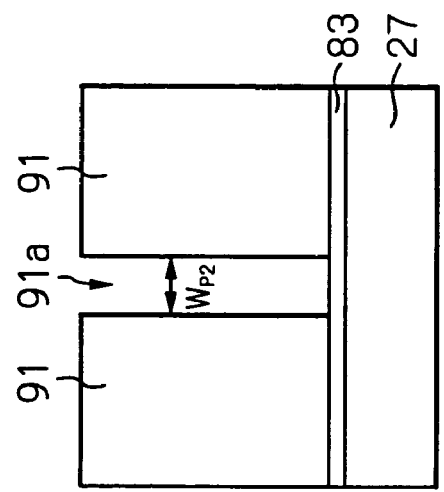

Next, the upper magnetic pole 84 is formed by plating a Ni—Fe alloy such as Permalloy with the use of the resist mask layer 91, as shown in FIGS. 10b and 10b'. Simultaneously, the back gap portion 90 of the yoke is formed.

Figure 10C:
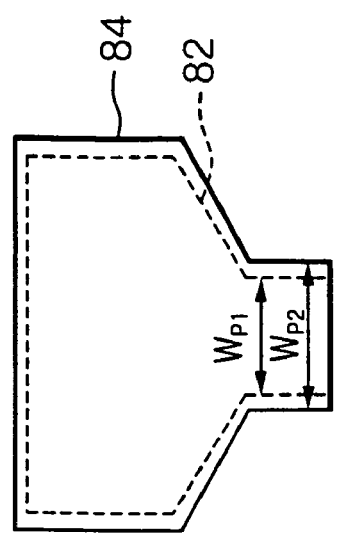
Figure 10D:
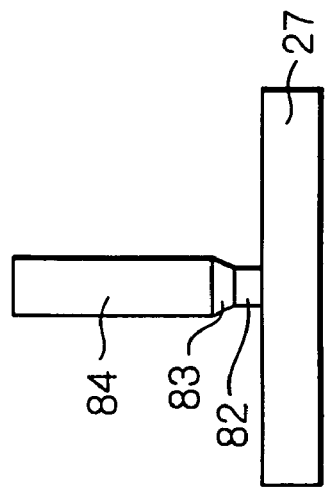
Figure 10D:
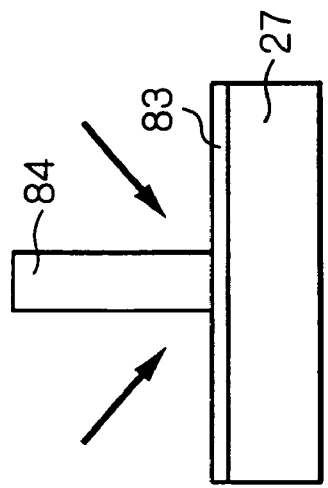

Then, as shown in FIG. 10c, after the resist mask layer 91 is removed, the forming process of the write gap layer 83 is performed and the lower magnetic pole layer 82 is simultaneously formed by etching the lower yoke layer 27, by means of dry-etching technique such as ion milling. In the case, the lower magnetic pole 82 is so formed that the lower magnetic pole 82 has a shape corresponding to a first pattern. Here, the first pattern means a pattern in which the width of the top end in the facing side to the magnetic medium (width in the track-width direction) is $W_{P1}$ ($W_{P1} < W_{P2}$) and the distance between the top end in the facing side to the magnetic medium and the flare point is $FPD_{P1}$ ($FPD_{P1} > FPD_{P2}$). Because the constituent material of the write gap layer 83 has the etching rate higher than that of the constituent material of the lower and upper magnetic poles, the cross-sectional shape of the write gap layer 83 becomes an inverted trapezoid as shown in FIG. 10d.

By the above-described process, the lower magnetic pole 82 and the upper magnetic pole 84 is obtained, where $W_{P1} < W_{P2}$ and $FPD_{P1} > FPD_{P2}$.

Then, as shown in FIG. 9d, an insulating film 92 for protecting the magnetic poles is formed by sputtering $Al_2O_3$, etc., and as shown in FIG. 9e, the coil conductor 29 is formed by plating Cu, etc. And as shown in FIG. 9f, the insulating layer 28 for isolating the coil lines from each other is formed of a resist material, etc.

Then, as shown in FIG. 9g, the upper surfaces of the upper magnetic pole 84, the coil conductor 29 and the insulating film 28 are planarized by polishing with the CMP method, etc., and as shown in FIG. 9h, an insulating film 93 for isolating the upper portion of the coil conductor 29 is formed by sputtering $Al_2O_3$, etc.

Then, as shown in FIG. 9i, the upper yoke layer 30 is formed by plating a Ni—Fe alloy such as Permalloy.

Because a wafer process afterward and a process for cutting and working the wafer performed after the wafer process are well known, the explanation of the processes will be omitted.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A thin-film magnetic head comprising an inductive element including at least:
   a lower magnetic pole;
   a write gap layer; and
   an upper magnetic pole opposed to said lower magnetic pole through said write gap layer,
   a width $W_{P2}$ in a track-width direction at a facing-to-magnetic-medium top end of said upper magnetic pole being larger than a width $W_{P1}$ in said track-width direction at a facing-to-magnetic-medium top end of said lower magnetic pole,
   a distance $FPD_{P2}$ between said top end of said upper magnetic pole and a flare point of said upper magnetic pole being smaller than a distance $FPD_{P1}$ between said top end of said lower magnetic pole and a flare point of said lower magnetic pole, and
   an area in a stacked surface of said upper magnetic pole being larger than an area in a stacked surface of said lower magnetic pole.

2. The thin-film magnetic head as claimed in claim 1, wherein an area in a stacked surface of said upper magnetic pole is larger than an area in a stacked surface of said lower magnetic pole.

3. The thin-film magnetic head as claimed in claim 1, wherein said inductive element further includes a lower yoke layer joined magnetically with said lower magnetic pole, and said lower magnetic pole is formed as a part of said lower yoke layer.

4. The thin-film magnetic head as claimed in claim 1, wherein said thin-film magnetic head further comprises a magnetoresistive effect element.

5. A thin-film magnetic head comprising an inductive element including at least:
   a lower magnetic pole;
   a write gap layer; and
   an upper magnetic pole opposed to said lower magnetic pole through said write gap layer,
   a width $W_{P2}$ in a track-width direction at a facing-to-magnetic-medium top end of said upper magnetic pole being larger than a width $W_{P1}$ in said track-width direction at a facing-to-magnetic-medium top end of said lower magnetic pole,
   a distance $FPD_{P2}$ between said top end of said upper magnetic pole and a flare point of said upper magnetic pole being smaller than a distance $FPD_{P1}$ between said top end of said lower magnetic pole and a flare point of said lower magnetic pole, and
   a width in said track-width direction at an opposite-to-magnetic-medium rear end of said upper magnetic pole being equal to or larger than a width in said track-width direction at an opposite-to-magnetic-medium rear end of said lower magnetic pole.

6. The thin-film magnetic head as claimed in claim 5, wherein said inductive element further includes a lower yoke layer joined magnetically with said lower magnetic pole, and said lower magnetic pole is formed as an independent layer of said lower yoke layer.

7. The thin-film magnetic head as claimed in claim 5, wherein said thin-film magnetic head further comprises a magnetoresistive effect element.

8. A thin-film magnetic head comprising an inductive element including at least:
   a lower magnetic pole;
   a write gap layer; and
   an upper magnetic pole opposed to said lower magnetic pole through said write gap layer,
   a width $W_{P2}$ in a track-width direction at a facing-to-magnetic-medium top end of said upper magnetic pole being larger than a width $W_{P1}$ in said track-width direction at a facing-to-magnetic-medium top end of said lower magnetic pole,
   a distance $FPD_{P2}$ between said top end of said upper magnetic pole and a flare point of said upper magnetic pole being smaller than a distance $FPD_{P1}$ between said top end of said lower magnetic pole and a flare point of said lower magnetic pole, and
   a length between said top end and said rear end of said upper magnetic pole being equal to or larger than a length between said top end and said rear end of said lower magnetic pole.

9. The thin-film magnetic head as claimed in claim 8, wherein said inductive element further includes a lower yoke layer joined magnetically with said lower magnetic pole, and said lower magnetic pole is formed as an independent layer of said lower yoke layer.

10. The thin-film magnetic head as claimed in claim 8, wherein said thin-film magnetic head further comprises a magnetoresistive effect element.

11. A head gimbal assembly comprising a thin-film magnetic head comprising an inductive element including at least:
    a lower magnetic pole;
    a write gap layer; and
    an upper magnetic pole opposed to said lower magnetic pole through said write gap layer,
    a width $W_{P2}$ in a track-width direction at a facing-to-magnetic-medium top end of said upper magnetic pole being larger than a width $W_{P1}$ in said track-width direction at a facing-to-magnetic-medium top end of said lower magnetic pole,
    a distance $FPD_{P2}$ between said top end of said upper magnetic pole and a flare point of said upper magnetic pole being smaller than a distance $FPD_{P1}$ between said top end of said lower magnetic pole and a flare point of said lower magnetic pole,
    an area in a stacked surface of said upper magnetic pole being larger than an area in a stacked surface of said lower magnetic pole, and
    said head gimbal assembly further comprising a suspension supporting said thin film magnetic head.

12. A head arm assembly comprising a head gimbal assembly comprising a thin-film magnetic head comprising an inductive element including at least:
    a lower magnetic pole;
    a write gap layer; and
    an upper magnetic pole opposed to said lower magnetic pole through said write gap layer,
    a width $W_{P2}$ in a track-width direction at a facing-to-magnetic-medium top end of said upper magnetic pole being larger than a width $W_{P1}$ in said track-width direction at a facing-to-magnetic-medium top end of said lower magnetic pole,
    a distance $FPD_{P2}$ between said top end of said upper magnetic pole and a flare point of said upper magnetic pole being smaller than a distance $FPD_{P1}$ between said top end of said lower magnetic pole and a flare point of said lower magnetic pole, and
    an area in a stacked surface of said upper magnetic pole being larger than an area in a stacked surface of said lower magnetic pole, and
    said head gimbal assembly further comprising a suspension supporting said thin film magnetic head.

13. A magnetic disk drive apparatus comprising:

at least one magnetic recording medium for recording information; and at least one head gimbal assembly comprising a thin-film magnetic head comprising an inductive element including at least:

a lower magnetic pole;

a write gap layer; and an upper magnetic pole opposed to said lower magnetic pole through said write gap layer, a width $W_{P2}$ in a track-width direction at a facing-to-magnetic-medium top end of said upper magnetic pole being larger than a width $W_{P1}$ in said track-width direction at a facing-to-magnetic-medium top end of said lower magnetic pole, a distance $FPD_{P2}$ between said top end of said upper magnetic pole and a flare point of said upper magnetic pole being smaller than a distance $FPD_{P1}$ between said top end of said lower magnetic pole and a flare point of said lower magnetic pole, an area in a stacked surface of said upper magnetic pole being larger than an area in a stacked surface of said lower magnetic pole, larger than an area in a stacked surface of said lower magnetic pole, said head gimbal assembly further comprising a suspension supporting said thin film magnetic head, and said magnetic disk drive apparatus further comprising means for moving said at least one head gimbal assembly on said at least one magnetic recording medium.

* * * * *